Jan. 17, 1961        A. E. ROLLER        2,968,357
ANTI-SQUAT SWING AXLE SUSPENSION
Filed Nov. 29, 1957        2 Sheets-Sheet 2

INVENTOR.
Albert E. Roller
BY
W. S. Pettigrew
ATTORNEY

United States Patent Office

2,968,357
Patented Jan. 17, 1961

2,968,357
ANTI-SQUAT SWING AXLE SUSPENSION

Albert E. Roller, Birmingham, Mich., assignor to General Motors Corporation, Detroit, Mich., a corporation of Delaware Filed Nov. 29, 1957, Ser. No. 699,815

3 Claims. (Cl. 180—73)

This invention relates to vehicle suspension and more particularly to swing axle independent rear wheel suspension.

An object of the invention is to provide an improved independent rear wheel suspension.

Another object is to provide a swing axle suspension for the driving wheels of a vehicle, which reduces the tendency of the vehicle to squat during acceleration.

Still another object is to provide a swing axle construction capable of preventing acceleration squat without inducing rear suspension oversteer in turns.

A further object is to provide a structure of the stated character which is arranged in such a manner that progressive increase in torque reaction of the differential housing operates to cause the swing axle inboard pivots to progressively incline away from a normal horizontal position whereby to provide a thrust component resisting vehicle squat.

A still further object is to provide a swing axle construction in which the control arms normally pivot about horizontal axes so that no wheel toe-out occurs during cornering but wherein the pivot axes are constrained under the influence of high torque to incline forwardly and upwardly to resist acceleration squat.

Still a further object is to provide an independent suspension for the driving wheels of a vehicle wherein the vehicle differential is pivotally secured to the vehicle frame on a transverse axis, the vehicle wheels being rotatably supported on transverse control arms pivotally mounted on the differential on axes extending generally longitudinally of the vehicle, the rearward end of the differential being vertically yieldable responsive to acceleration torque from a predetermined normal position in which the pivot axes of the control arms are substantially horizontal.

Yet a further object is to provide a structure of the stated character wherein the transverse pivotal connection between the differential and frame is co-linear with the effective center of the universal joint connecting the vehicle propeller shaft with the differential.

These and other objects, advantages and features of the invention will become more fully apparent as reference is had to the accompanying specification and drawings wherein.

Figure 1:
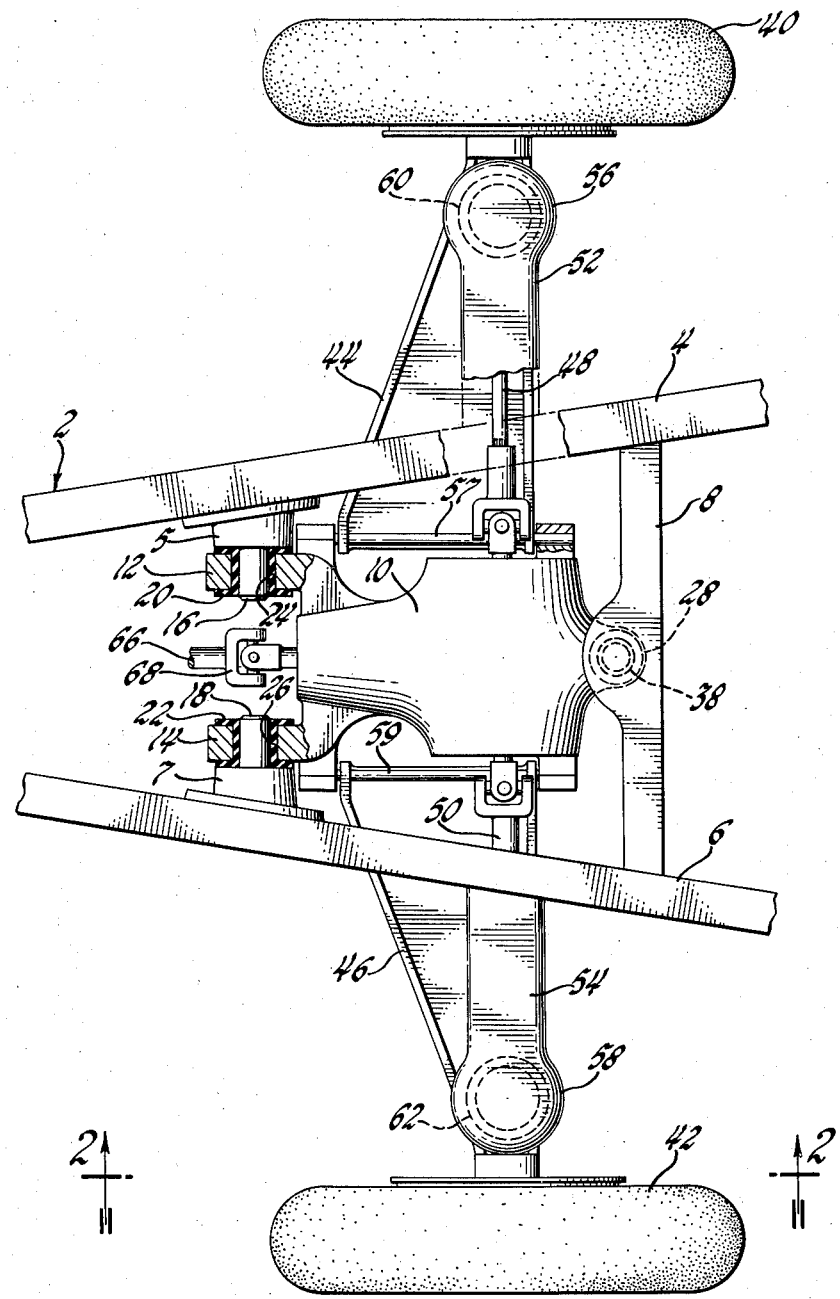
Fig. 1 is a plan view of a vehicle suspension incorporating the present invention.

Referring now to the drawings and particularly Fig. 1, reference numeral 2 designates generally a vehicle frame including a pair of generally longitudinally extending laterally spaced apart side rails 4 and 6 and a rear cross member 8. Disposed between side rails 4 and 6 and slightly forwardly of cross member 8 is a power transmission or differential assembly 10 having a pair of laterally spaced apart forwardly extending arms 12 and 14 which are journalled respectively on trunnions 16 and 18. Trunnions 16 and 18, in turn, are rigidly, but preferably detachably, secured in transverse alignment in brackets 5 and 7 formed on side rails 4 and 6, respectively. In order to assure optimum road noise isolation, annular resilient bushings 20 and 22 are preferably interposed between trunnions 16 and 18 and the associated apertures 24 and 26 formed in arms 12 and 14.

Figure 2:
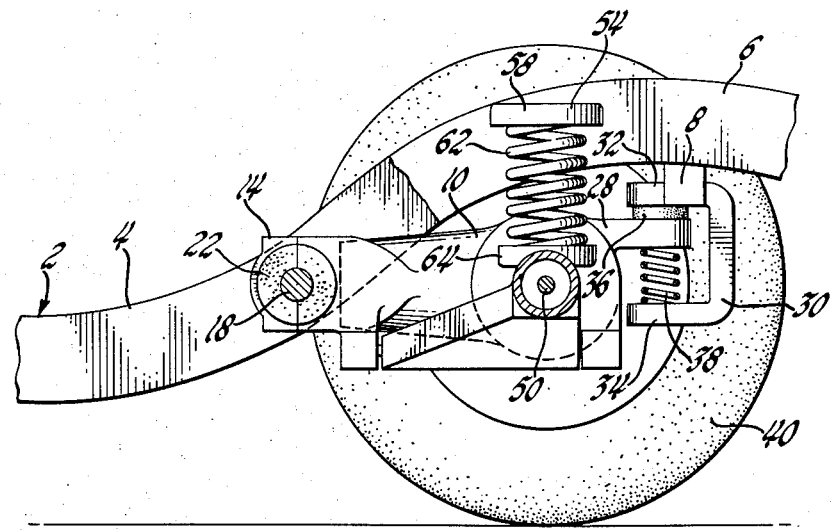
Fig. 2 is a view looking in the direction of arrows 2—2 of Fig. 1.

As seen best in Fig. 2, the rearward end of differential assembly 10 is formed with an integral projection 28 which extends rearwardly into the space defined by a generally U-shaped depending bracket member 30 secured to the underside of frame cross member 8. Member 30 includes upper and lower forwardly extending portions 32 and 34 respectively which overlap projection 28. Portion 32 is provided with a depending resilient abutment pad 36 which normally engages the upper surface of projection 28, while portion 34 supports a coil spring 38 or similar resilient member which acts to resiliently urge projection 28 into engagement with buffer 36.

Spaced at lateral opposite sides of frame 2 are a pair of driving wheels 40 and 42, which are rotatably supported on oppositely directed transversely extending wheel guiding control arms 44 and 46. At their inboard ends, arms 44 and 46 are pivotally secured in any convenient manner to differential housing 10 for oscillation about generally horizontal longitudinally extending axes which are spaced substantially below the normal rotational axis of the wheels. Each wheel is operatively connected to differential 10 by means of swinging half axles 48 and 50. Spaced above axles 48 and 50 and rigidly connected to frame 2 are a pair of outrigger members 52 and 54 which provide upper seats 56 and 58 for springs 60 and 62. The lower end of the springs, in turn, engage suitable lower seats 64 formed on the outboard ends of control arms 44 and 46.

Figure 3:
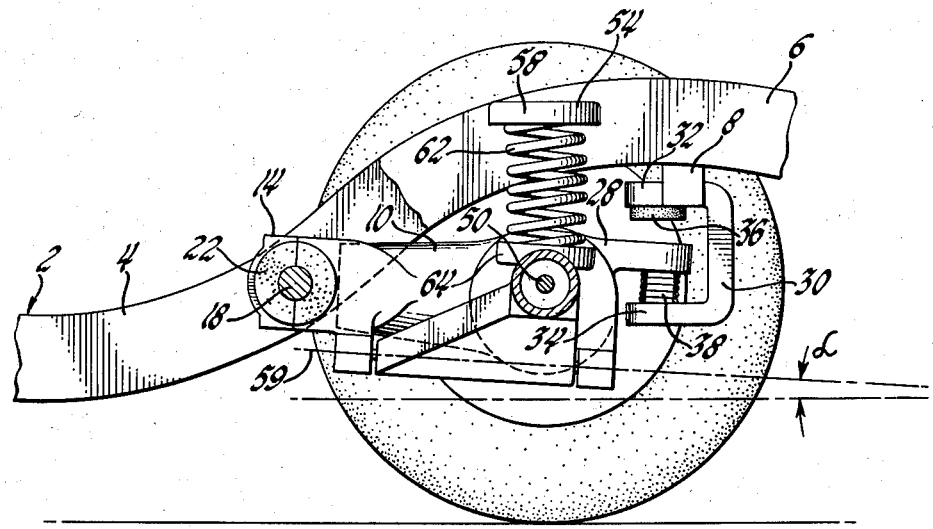
Fig. 3 is a view similar to Fig. 2, showing the change in relative position of the parts during vehicle acceleration.

In accordance with one feature of the invention, when the vehicle is either at rest or moving forward under conditions other than substantial acceleration, differential assembly 10 maintains a substantially horizontal attitude due to the upward force exerted by spring 38 on projection 28. However, upon substantial acceleration of the vehicle, increased torque is applied to swinging half axles 48 and 50, which in turn results in torque reaction causing differential 10 to rotate clockwise about the transverse axis defined by trunnions 16 and 18. As differential 10 rotates to the position shown in Fig. 3, the inboard pivot axes 57 and 59 of arms 44 and 46 incline forwardly and upwardly at an angle α, producing a thrust component acting on the sprung mass to resist the normal tendency of the vehicle to squat. As rapidly as the rate of acceleration of the vehicle decreases, spring 38 acts to return differential 10 and pivot axes 57 and 59 to their normal horizontal position.

It will now be seen that angular movement of pivot axes 57 and 59 to the anti-squat inclination is a function of relatively high torque application such as occurs primarily when the vehicle is accelerating from a standing start. Therefore, when the vehicle is negotiating turns at normal speeds, pivot axes 57 and 59 remain horizontal and there is no tendency for the rear wheels to toe-out upon upward deflection and over-steer of the vehicle, such as would be the case if the axes 57 and 59 were permanently maintained at the anti-squat inclination. Furthermore, even when the vehicle is accelerated while negotiating a turn, the increase in torque reaction is sufficiently small, due to the forward motion of the vehicle, that little if any toe-out effect occurs as a result of cornering.

In accordance with another feature of the invention, the engine driven propeller shaft 66 is connected to differential 10 by means of a universal joint 68, the effective center of which is co-linear with the axis defined by trunnions 16 and 18. By virtue of this arrangement, propeller shaft 68 rotates about a constant axis regardless of momentary changes in angular inclination of differential 10.

In addition to the features heretofore mentioned, the present construction presents the additional advantage of decreasing high gear stresses which may occur in the case of suddenly applied impact loads. Further, the entire suspension and driving assembly is readily detachable as a unit by merely disconnecting the pivotal connection of arms 12 and 14 with trunnions 16 and 18.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. Independent suspension for the traction wheels of a vehicle comprising, a frame, a power transmitting member having a longitudinally directed driven element and laterally directed driving elements, traction wheels connected to said driving elements, means hinging said member to said frame on a fixed transverse axis spaced longitudinally forwardly from said driving elements for swinging movement about said axis, a downwardly facing abutment pad on said frame engaged by said member to define the normal angular position thereof, resilient means urging said member into engagement with said pad, wheel guiding arms hinged to said power transmitting member on axes fixed with respect to said member, said axes being caused to change angularly from said normal horizontal position to a downwardly and rearwardly inclined position responsive to corresponding change in angular inclination of said member induced by acceleration torque reaction thereof.

2. In a motor vehicle having an engine driven propeller shaft, a final drive and traction wheel suspension comprising, a frame, a power transmitting member having a longitudinally directed driven element universally connected to said propeller shaft, a pair of laterally oppositely directed driving elements, traction wheels connected to said driving elements, means hinging said member to said frame at the rear thereof on a fixed transverse axis spaced longitudinally forwardly of said driving element, said hinging means including laterally spaced apart forwardly extending arms on said member and bearing apertures in the forward ends of said arms journalled on trunnions secured to said frame, the axis of said trunnions coinciding with said transverse axis, a generally U-shaped bracket depending from said frame rearwardly of said member, a projection on said member, said U-shaped member having an upper and a lower forwardly extending portion overlapping said projection, said upper portion forming an abutment engaged by said member to define the normal angular position thereof, yieldable means disposed between said projection and said lower portion urging said member against said abutment, rigid wheel guiding arms hinged at their inner ends to said power transmitting member on axes fixed with respect to said member and projecting horizontally when said member is in its normal angular position, said power transmitting member being movable angularly about said transverse axis under the influence of acceleration torque in a direction imparting downward and rearward inclination to the hinge axes of said wheel guiding arms.

3. The structure set forth in claim 2 wherein the universal connection between said driven element and said propeller shaft is colinear with said transverse axis.

References Cited in the file of this patent

UNITED STATES PATENTS

| | | |
|---|---|---|
| 2,145,670 | Tjaarda | Jan. 31, 1939 |
| 2,199,517 | Best | May 7, 1940 |
| 2,369,501 | Wagner | Feb. 13, 1945 |
| 2,681,118 | Roller | June 15, 1954 |
| 2,738,024 | Saives | Mar. 13, 1956 |
| 2,806,543 | Nallinger | Sept. 17, 1957 |